(12) United States Patent
Gerpheide et al.

(10) Patent No.: US 6,222,528 B1
(45) Date of Patent: Apr. 24, 2001

(54) METHOD AND APPARATUS FOR DATA INPUT

(75) Inventors: George E. Gerpheide, Salt Lake City; Rick L. Johnson, Ogden; Marty McDonald, Salt Lake City, all of UT (US)

(73) Assignee: Cirque Corporation, Salt Lake City, UT (US)

( * ) Notice: Subject to any disclaimer, the term of this patent is extended or adjusted under 35 U.S.C. 154(b) by 0 days.

(21) Appl. No.: 08/813,158

(22) Filed: Mar. 7, 1997

(51) Int. Cl.$^7$ .................................................. G09G 5/00
(52) U.S. Cl. ............................................. 345/173; 345/174
(58) Field of Search .................................. 345/173, 174, 345/178, 179

(56) References Cited

U.S. PATENT DOCUMENTS

| | | | |
|---|---|---|---|
| 3,857,092 | * 12/1974 | Meyer | 324/662 |
| 3,886,311 | * 5/1975 | Rodgers et al. | 178/20.04 |
| 3,921,166 | * 11/1975 | Volpe | 341/26 |
| 4,032,841 | * 6/1977 | Knippelmier | 324/678 |
| 4,071,691 | * 1/1978 | Pepper, Jr. | 178/18.05 |
| 4,103,252 | * 7/1978 | Bobick | 331/48 |
| 4,129,747 | * 12/1978 | Pepper, Jr. | 178/18.05 |
| 4,186,392 | * 1/1980 | Holz | 345/174 |
| 4,190,785 | * 2/1980 | Kompanek | 313/330 |
| 4,237,421 | * 12/1980 | Waldron | 327/517 |
| 4,246,452 | * 1/1981 | Chandler | 200/5 A |
| 4,371,746 | * 2/1983 | Pepper, Jr. | 178/18.05 |
| 4,455,452 | * 6/1984 | Schuyler | 178/18.06 |
| 4,476,463 | * 10/1984 | Ng et al. | 345/174 |
| 4,495,485 | * 1/1985 | Smith | 341/33 |
| 4,550,221 | * 10/1985 | Mabusth | 178/18.06 |
| 4,587,378 | * 5/1986 | Moore | 345/173 |
| 4,639,720 | * 1/1987 | Rympalski et al. | 345/174 |
| 4,672,154 | * 6/1987 | Rodgers et al. | 178/19.07 |
| 4,680,430 | * 7/1987 | Yoshikawa et al. | 345/174 |
| 4,686,332 | 8/1987 | Greanias et al. | 345/173 |
| 4,698,461 | * 10/1987 | Meadows et al. | 345/174 |
| 4,700,022 | 10/1987 | Salvador et al. | 178/20.03 |
| 4,707,573 | 11/1987 | Etherington et al. | 178/18.03 |
| 4,707,845 | 11/1987 | Krein et al. | 178/20.01 |
| 4,736,191 | 4/1988 | Matzke et al. | 341/20 |
| 4,740,781 | 4/1988 | Brown | 345/174 |
| 4,743,895 | 5/1988 | Alexander | 345/174 |
| 4,845,682 | 7/1989 | Boozer et al. | 367/93 |
| 4,873,400 | 10/1989 | Rapp et al. | 178/18.05 |
| 4,922,061 | 5/1990 | Meadows et al. | 345/175 |

(List continued on next page.)

FOREIGN PATENT DOCUMENTS

| | | |
|---|---|---|
| 88 109 258 | * 6/1990 | (DE) . |
| 0 574 213 A1 | 6/1993 | (EP) . |
| 0 665 508 A2 | 12/1994 | (EP) . |
| 2026745 | * 6/1979 | (GB) . |
| 56-132028 | 10/1981 | (JP) . |
| 59-97889 | 5/1984 | (JP) . |
| 60-291213 | * 12/1985 | (JP) . |
| 61-115118 | 6/1986 | (JP) . |
| US90/04584 | 3/1991 | (WO) . |

*Primary Examiner*—Matthew Luu
(74) *Attorney, Agent, or Firm*—Morriss, Bateman, O'Bryant, Compagni (57) ABSTRACT

A method and apparatus for providing accelerated X and Y axis position determination of a probe relative to a touchpad surface by enabling determination of the X and Y axis coordinates independent of each other. The apparatus of the present invention enables simplification of the electronics of the touchpad because fewer sense lines are required to achieve position resolution which is finer than the electrode pitch. Position determination is further accelerated because fewer position measurements are then required to compensate for such problems as probe symmetry duplication.

28 Claims, 10 Drawing Sheets

U.S. PATENT DOCUMENTS

| | | | |
|---|---|---|---|
| 4,975,830 | 12/1990 | Gerpheide et al. | 345/168 |
| 4,983,787 * | 1/1991 | Kunikane | 345/173 |
| 5,016,008 | 5/1991 | Gruaz et al. | 341/33 |
| 5,053,757 | 10/1991 | Meadows | 345/173 |
| 5,196,838 | 3/1993 | Meier et al. | 345/118 |
| 5,252,951 | 10/1993 | Tannenbaum et al. | 345/150 |
| 5,305,017 * | 4/1994 | Gerpheide | 345/174 |
| 5,309,555 | 5/1994 | Akins et al | 345/330 |
| 5,327,161 | 7/1994 | Logan et al. | 345/157 |
| 5,333,247 | 7/1994 | Gest et al. | 345/438 |
| 5,349,303 | 9/1994 | Gerpheide | 330/257 |
| 5,374,787 | 12/1994 | Miller et al. | 178/18.06 |
| 5,406,307 | 4/1995 | Hirayama et al. | 345/340 |
| 5,422,993 | 6/1995 | Fleming | 345/348 |
| 5,459,463 | 10/1995 | Gruaz et al. | 341/33 |
| 5,463,388 | 10/1995 | Boie et al. | 345/174 |
| 5,485,174 | 1/1996 | Henshaw et al. | 345/123 |
| 5,488,204 | 1/1996 | Mead et al. | 345/179 |
| 5,491,495 | 2/1996 | Ward et al. | 345/173 |
| 5,495,566 | 2/1996 | Kwatinetz | 345/341 |
| 5,506,951 | 4/1996 | Ishikawa | 345/341 |
| 5,510,813 * | 4/1996 | Makinwa et al. | 345/173 |
| 5,528,260 | 6/1996 | Kent | 345/123 |
| 5,530,865 | 6/1996 | Owens et al. | 709/300 |
| 5,543,590 | 8/1996 | Gillespie et al. | 178/18.06 |

* cited by examiner

METHOD AND APPARATUS FOR DATA INPUT

BACKGROUND

1. The Field Of The Invention

This invention relates to position sensitive input devices. More specifically, the invention is a touchpad surface which responds to a position or a change of position of a probe which is moveable on or above the surface, thereby responding to a change in mutual capacitance between electrode arrays and a shared or common sense electrode caused by interference of the probe.

2. The State Of The Art

Input devices for computers are well known in the art. There are several types of input devices including the familiar "mouse." The mouse has become so popular because, when combined with a graphical user interface (GUI), it is so much easier to use than typed keyboard commands. The mouse has been accepted as a "user friendly" input device for both experienced and novice computer users. The popularity which the mouse has achieved in the art can be given large credit for fostering the explosive growth of the personal computer industry since a mouse provides a simple means for users to input data to a computer.

While mice are currently the most popular non-keyboard input device, a mouse generally requires a free-rolling surface, i.e. a table top, on which it can operate. Disadvantageously, a mouse is not well suited for use in cramped spaces or with a portable computer, particularly laptop, notebook, sub-notebook, and palmtop computers.

In answer to the long existing need for a more convenient input device suitable for both portable and desktop computers, various alternative input devices have been proposed. Such alternative input devices include devices commonly referred to as track balls, track pens, track point devices, as well as various devices which sense the position of a pointing object on a position sensing surface. The devices which sense the position of a pointing object on a sensing surface generally have the advantages of being simple to use, being easily integrated with current computers and other computing devices, reliability, ruggedness, compactness, and the ability to be transported and used in a variety of locations.

Numerous types of input devices utilize a position sensing surface. Examples are provided in the following patent references: U.S. Pat. No. 4,672,154, to Rodgers et al. (Cordless stylus which emits a directional electric field from the tip of a conductive pen cartridge sensed by a digitizer tablet having an X-Y coordinate system); U.S. Pat. No. 4,680,430 to Yoshikawa et al. (A tablet-like coordinate detecting apparatus including a resistive film for determining the coordinate position data of a point on a plane indicated by the touch of a finger tip or other load); U.S. Pat. No. 4,103,252 to Bobick (A position sensing tablet with electrodes located on the boundaries of a sensing region which detects a human touch by the change in capacitance caused by the touch which varies the time constant of an RC network which is part of an oscillator); U.S. Pat. No. 4,736,191 to Matzke (A touch activated control device comprising individual conductive plates wherein a user's touch on the dielectric layer overlaying the plates is detected by individually charging and discharging each of the sectors in the plates in a sequential manner to determine the increased capacitance of the sector); U.S. Pat. No. 4,550,221 to Mabusth (A touch sensitive control device which translates touch location to output signals and which includes a substrate that supports first and second interleaved, closely spaced, non-overlapping conducting plates); U.S. Pat. No. 4,639,720 to Rympalski et al. (An electronic sketch pad which contains a graphics input pad having an array of transparent capacitive pixels, the capacitance characteristics of which are changed in response to the passing of a conductive tipped stylus over the surface of the pad); and, European Patent Publication No. 574,213 (A proximity sensor includes a sensor matrix array which senses changes in capacitance between horizontal and vertical conductors connected to the position sensing pad to determine x, y, & z position information).

A particularly useful and advantageous input device is disclosed in U.S. Pat. No. 5,305,017 issued to Gerpheide (hereinafter referred to as the '017 patent and incorporated herein by reference). In summary, the Gerpheide patent discloses a device and method for overcoming some drawbacks inherent in other input devices which utilize a sensing tablet or sensing surface. The device and method of the '017 patent include a touch sensitive input pad upon which a user conveniently provides input information utilizing a finger or other conductive probe. In typical operation, the user's finger tip is brought in close proximity to a top surface of the position sensing surface of the touch sensitive pad. The touchpad detects the position of the finger tip relative to the X and Y axes in a plane of the touchpad surfaces as well as the finger's proximity in the Z axis in relation to the touchpad surface.

The '017 patent has as one of its distinguishing characteristics the utilization of a measurable decrease in mutual capacitance between electrodes caused by introduction of the finger near the electrodes which are disposed beneath the surface of the touchpad. Mutual capacitance is thereby distinguished from the concept of capacitance of an electrode. The capacitance of an electrode is more commonly defined as the capacitance between the electrode and ground. The concept of utilizing a measurable decrease in mutual capacitance is attributable in part to the use of a virtual dipole electrode (VDE).

Figure 1:
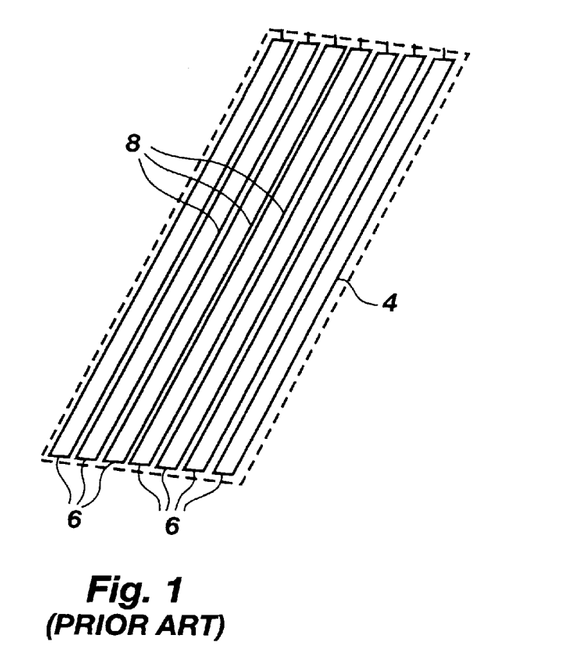
FIG. 1 is a perspective diagram of electrodes which are used as the building blocks for virtual dipole electrode arrays (VDEs) as used in the present invention.

The VDE is explained in the '017 patent as being comprised of two index electrode arrays. As shown in FIG. 1, each index electrode array 4 is an array of strip electrodes 6 arranged in a sheet disposed beneath the surface of the touchpad with gaps 8 between the strips 6 to provide electrical isolation. A first array is disposed generally parallel to the surface, and generally perpendicular to an axis along which the position of a probe (i.e. a finger) is to be determined. A second array is disposed in the same plane as the first index electrode array, but rotated at an angle (generally 90 degrees) with respect to the first array. Consequently, the index-index array provides sensing along two axes (the X and Y axes).

The VDE is defined as a virtual dipole because the electrodes can be assigned as belonging to a "P" group, or can be assigned as belonging to an "N" group, where P is defined as a positive edge, and N is defined as a negative edge. Dynamic polarity grouping enables the Ps and Ns to be selectively connected to charge inducing circuitry, and therefore to be switched as desired.

Before discussing how the present invention improves upon the technology disclosed in the '017 patent, it is helpful to further distinguish other state of the art patents from the '017 patent as given above. First, the prior art of Greanias et al., U.S. Pat. No. 4,686,332, differs from the '017 patent because instead of measuring mutual capacitances, Greanias teaches measuring the capacitance of the electrodes with respect to ground. In other words, mutually adjacent vertical and mutually adjacent horizontal conductors having the maximum change in their capacitance are located by finding the electrodes having the greatest increase in capacitance relative to a fixed reference point such as ground. Consequently, while Greanias et al. is concerned with locating conductors having the highest increase in capacitance, '017 teaches measuring the change in mutual capacitance in order to find a linear interpolation region. Ultimately, Greanias et al. fails to achieve the position resolution of the '017 patent because it is limited to resolutions no smaller than the electrode pitch, whereas the '017 patent is able to use linear VDE interpolation to determine resolution much finer than the electrode pitch.

While Greanias fails to accomplish position determination utilizing mutual capacitance measurements, the concept is not unique. For example, U.S. Pat. No. 4,186,392 issued to Holz teaches a keyboard having keypads which are interdigitated with a shared sense electrode. The capacitance between the keypads and the shared sense electrode is measured to determine over which keypad a probe (finger) is positioned, thereby causing a decrease in mutual capacitance. What is important to recognize is that the keyboard is only capable of discrete position determination. In other words, the probe's position can only be determined as being at the discrete locations where a keypad is interdigitated with a sense electrode.

Another patent is issued to Schuyler (U.S. Pat. No. 4,455,452). Schuyler teaches a means for balancing electrode charges for probe position determination. However, the method includes using capacitive coupling to a reference point for position determination, similar to Greanias et al. Furthermore, while Schuyler has much better position resolution than Holz, the position of the probe is not determinable at resolution smaller than the electrode pitch.

Consequently, while the method and apparatus taught in the '017 patent has substantially improved upon the state of the art, position determination still requires that a significant number of measurement calculations be performed. What is needed is a position determining method and apparatus which can take advantage of the high resolution position determination accomplished by the '017 patent, and yet decrease the total number of measurements that must be taken, and consequently realize a reduction in measurement cycle times. It would also be an improvement to reduce the number of wires required to accomplish the measurements, and thereby decrease system complexity.

OBJECTS AND SUMMARY OF THE INVENTION

It is an object of the present invention to accomplish position determination of a probe relative to a touchpad sensor while utilizing fewer sensing wires in the touchpad as compared to the touchpads of the prior art.

It is another object to provide a common (shared) sense electrode for both an X axis electrode array and a Y axis electrode array to thereby achieve more rapid measurement cycles than previous touchpads which required more measurements to resolve symmetry problems which result in a detected probe being potentially located at either of two diametrically opposite locations on the touchpad surface.

It is another object to provide a method and apparatus for X and Y axis position determination of a probe relative to a touchpad surface, where the X and Y axis coordinates are determined independently of each other.

It is another object to provide a method and apparatus for X and Y axis position determination of a probe relative to a touchpad surface, where the method requires fewer measurements as compared to the methods of the prior art.

It is another object to provide a method and apparatus for X and Y axis position determination of a probe relative to a touchpad surface, where the apparatus consumes less power compared to the apparatus of the prior art;

It is another object to provide an apparatus for X and Y axis position determination comprised of X and Y electrode arrays and a common sense electrode, wherein the X array, the Y array, and the sense electrode are disposed in a co-planar relationship forming layers beneath a touch surface.

It is another object to provide an apparatus where the X array, the Y array and the sense electrode can disposed in layers in any order relative to the touchpad surface.

It is another object to provide an apparatus for X and Y axis position determination of a probe relative to a touchpad surface wherein a common sense electrode beneath the touchpad surface is embedded within the X or the Y electrode array in a co-planar relationship.

It is another object to provide a method for position determination which utilizes virtual dipoles which take advantage of interpolation techniques to achieve resolution finer than the electrode pitch between electrodes.

In accordance with these and other objects of the present invention, the advantages of the invention will become more fully apparent from the description and claims which follow, or may be learned by the practice of the invention.

The present invention is realized, in a preferred embodiment, in a method and apparatus which provides X and Y axis position determination of a probe relative to a touchpad surface by enabling determination of the X and Y axis coordinates independently of each other. The apparatus of the present invention enables simplification of the electronics of the touchpad because fewer sense lines are required to achieve position resolution finer than the electrode pitch. Position determination is further accelerated because fewer position measurements are then required to compensate for such problems as probe symmetry duplication.

In a first aspect of the invention, a sense electrode is shared in common by the X and Y electrode array. In essence, two independent index-sense arrays are created by providing a first electrode array for the X coordinate determination and a second electrode array for the Y coordinate determination.

In another aspect of the invention, the position of the X electrode array, the Y electrode array and the sense electrode as layers beneath thee touchpad surface are shown to be interchangeable while enabling position determination of the probe relative to the arrays.

In another aspect of the invention, the sense electrode is combined with the X electrode array or the Y electrode array in a same electrode sheet to thereby reduce the number of layers beneath the touchpad surface, and thus simplify fabrication of the touchpad resulting in reduced costs.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

To understand the improvements provided by the preferred embodiment, it is helpful to look in more detail at each aspect of the '017 patent which is improved upon by the present invention.

Figure 2:
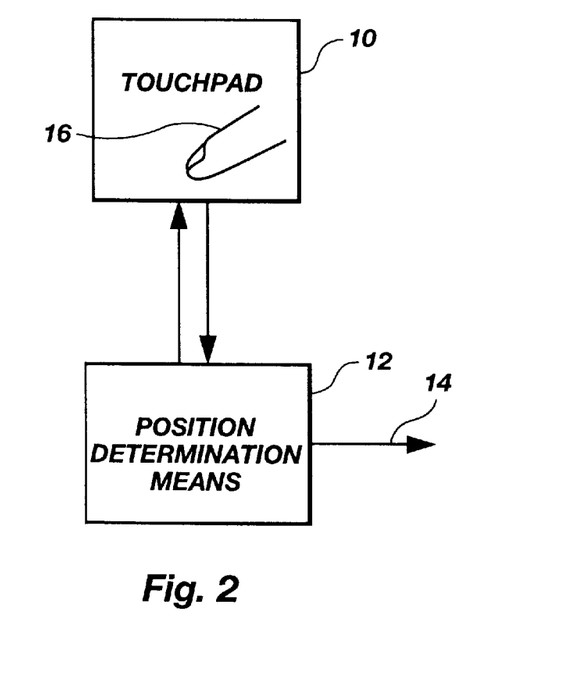
FIG. 2 is a block diagram of the main elements of the preferred embodiment of the present invention.

The preferred embodiment of the present invention is presented as a block diagram in FIG. 2. FIG. 2 shows a touchpad 10 including electrode arrays and a surface, and a position determination means 12 with which the touchpad 10 communicates via a plurality of wires in both directions. The information derived from the position determination means 12 is the position 14 of a conductive probe 16 (typically a finger) on a surface of the touchpad 10 relative to a coordinate axis system provided therein.

The functionality provided by the position determination means 12 is an important improvement over the prior art of the '017 patent. Furthermore, the arrangement of electrode arrays within the touchpad 10 are also modified to achieve the benefits of the present invention as will be explained.

Before providing more detail into the structure of the touchpad 10 and the position determination means 12, it is helpful to understand an overview of the method of operation of the present invention. While discussing the flowcharts of FIGS. 3, 4 and 5 all references items referring to apparatus refer to items identified in FIG. 2 unless otherwise defined.

Figure 3:
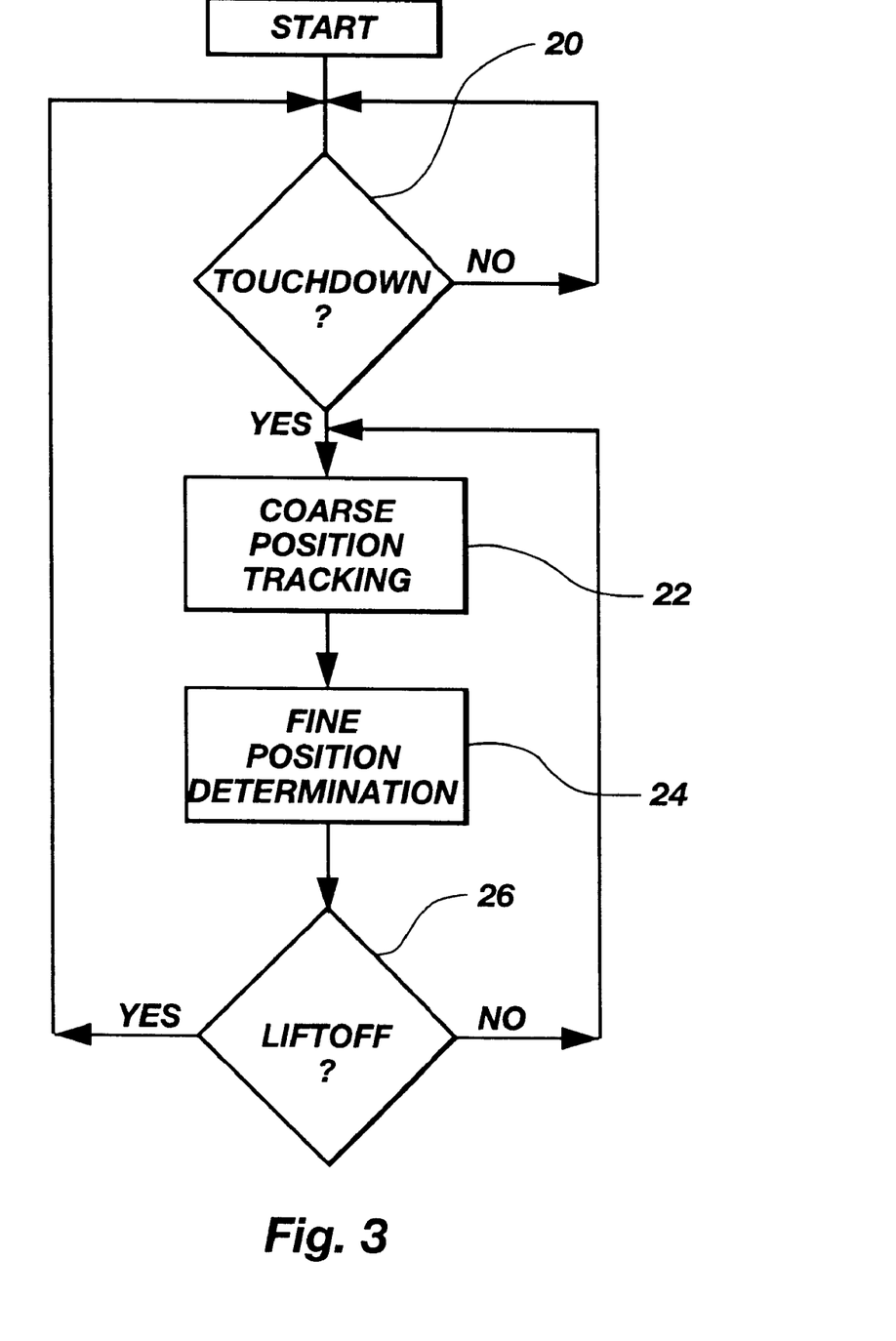
FIG. 3 is a flowchart of the method of operation of the present invention, but which does not expose the novelty of the present invention.

To begin, the flowchart shown in FIG. 3 provides a summary of the methodology utilized by the present invention to accomplish position determination of a probe on or above a touchpad 10. Specifically, step 20 is a decision block which asks whether the apparatus of the present invention has detected a new contact on or above the touchpad surface 10 by a probe 16. This step 20 is referred to as looking for a touchdown. The touchpad 10 detects a touchdown by looking for an imbalance in capacitance across the electrode arrays thereof as disclosed in the '017 patent.

Once a touchdown is detected, the next step 22 is to begin coarse position tracking of the probe 16. This involves determining which X axis and Y axis electrodes are closest to (i.e. are on either side of) the probe 16 as disclosed in the '017 patent. Once coarse position tracking is accomplished, the next step 24 is to more precisely determine the position of the probe 16 through fine position determination algorithms. This is accomplished using interpolation techniques which enable probe position determination at resolutions smaller than the distance between X and Y axis electrodes, as explained in the '017 patent. This fine position information is then utilized by, for example, a computer in determining a position of a cursor on a computer display. Finally, step 26 is a decision block which asks whether the probe 16 has been removed from the touchpad surface 10. If the probe 16 is removed, the next step is to return to step 20 to determine when the probe 16 again makes contact with the touchpad surface 10. Otherwise, the process repeats steps 22, 24 and 26 so that as the probe moves across the touchpad surface 10, the position of the cursor on the computer display can be updated generally simultaneously.

The steps in the flowchart of FIG. 3 can now be expanded in order to learn more detail about the method for position determination utilized by the preferred embodiment of the present invention. Looking at the flowchart of FIG. 4, step 20 of FIG. 3 is now accomplished by step 30 which is the step of determining the position of the probe 16 in the Z axis which extends perpendicularly above the touchpad surface 10, and as explained in the '017 patent.

Figure 4:
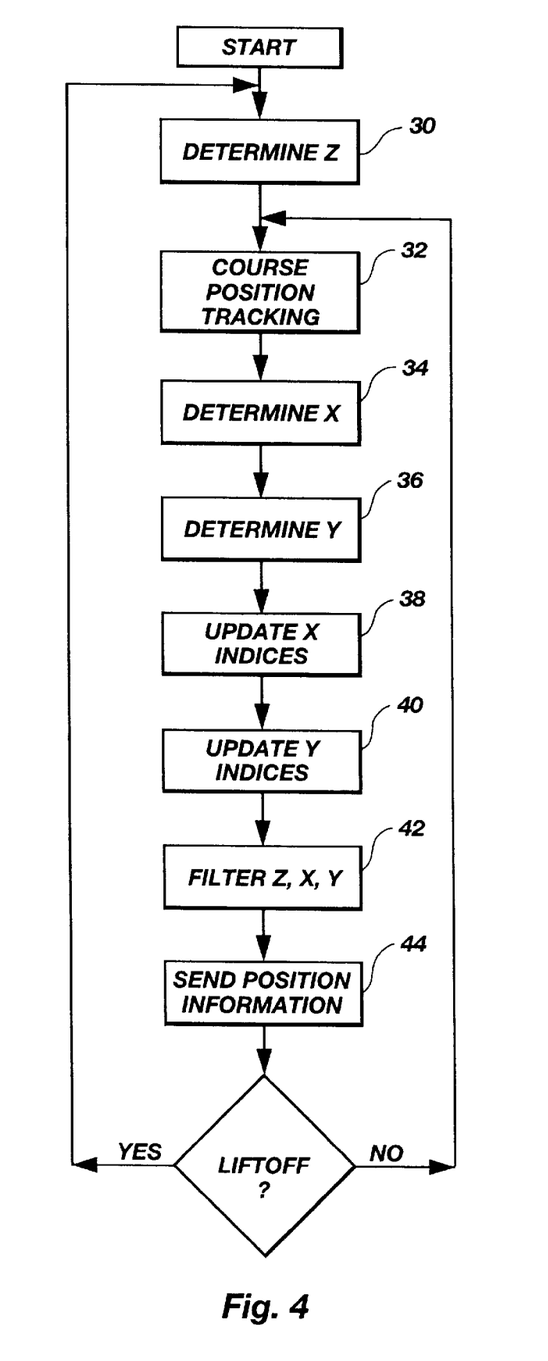
FIG. 4 is a an expanded flowchart which takes the elements of the flowchart of FIG. 3 and provides more detail as to the function of each step.

Step 22 of FIG. 3 is represented by step 32 in FIG. 4. The same coarse position tracking is accomplished to determine which of the X and Y axis electrodes are closest to the probe 16 after touchdown on the touchpad surface 10.

Step 24 of FIG. 3 is now represented by steps 34, 36, 38, 40, 42 and 44 in FIG. 4. Steps 34 and 36 are for determining the position of the probe 16 on the touchpad surface 10 at higher resolutions than obtained in step 22. Specifically in the preferred embodiment, the apparatus of the present invention uses techniques such as the method of linear interpolation as disclosed in the '017 patent to determine more precisely the position of the probe 16 in the X and Y axes.

As taught in the '017 patent, the steps of 38, 40 and 42 in FIG. 4 are used to update indices and clean the signals of noise which are being used to determine position of the probe 16. Finally, step 44 is the process of utilizing the probe position information. In the preferred embodiment, the probe position is used to update the position of the cursor on the computer display.

Figure 5:
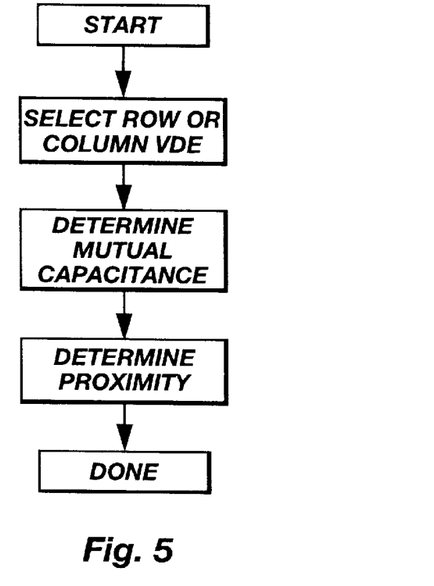
FIG. 5 is an expanded flowchart providing detail of a preferred method for determining position of the probe in the Z axis relative to a first electrode array or a second electrode array.

FIG. 5 is provided in order to expand upon step 30 of FIG. 4. The flowchart of FIG. 5 teaches that the preferred embodiment enables the present invention to determine a position of the probe relative to the row or column (X or Y axis) electrode array. It may be advantageous not to provide this option and therefore to select only one of the electrode arrays to be used in determining a Z position of the probe. Nevertheless, it is possible to determine the Z position relative to one or both of the electrode arrays.

In order to understand how the present invention improves position determination, it is necessary to look at how the apparatus of the present invention differs fundamentally in structure from the '017 patent. Essentially, the '017 patent and the present invention use different electrode array structures. Specifically, whereas the '017 patent uses an index-index electrode array, the present invention uses an index-sense electrode array.

Figure 6:
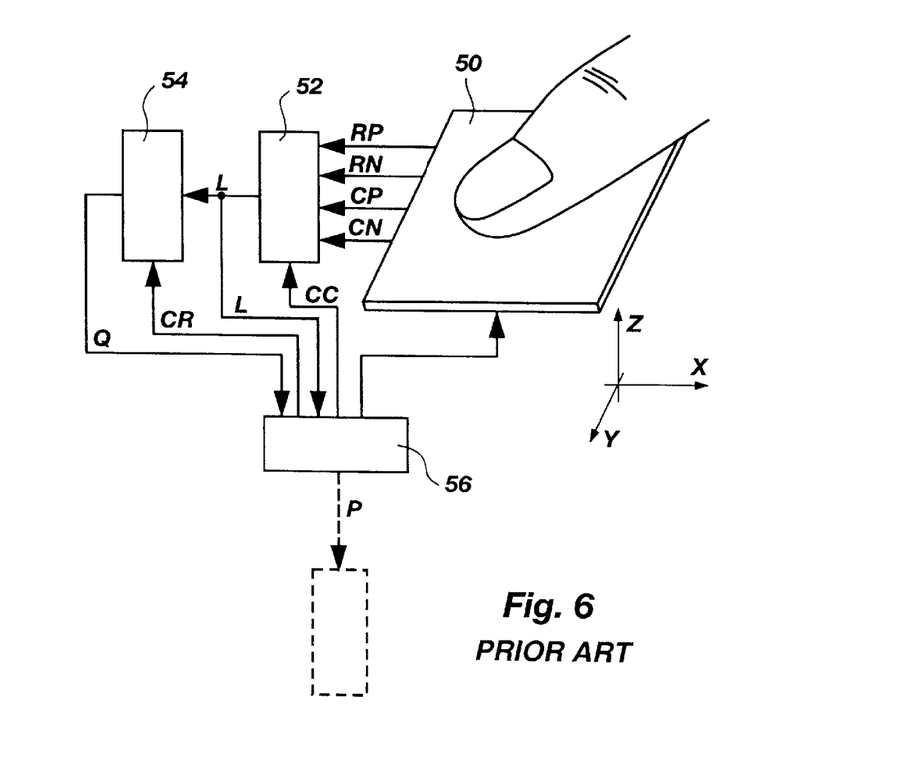
FIG. 6 is a block diagram of the preferred embodiment of the prior art disclosed in U.S. Pat. No. 5,305,017 issued to Gerpheide.

The index-index electrode array of the '017 patent is shown generally in FIG. 6. FIG. 6 shows a touch sensitive input device comprised of a virtual electrode pad 50, electrical balance measurement circuit 52, balance ratio determination circuit 54, and control circuit 56. The virtual electrode pad 50 is preferably in the shape of a sheet. The electrodes are referred to as a virtual electrode pad 50 because separate conductive strips on a bottom side and a top side of the virtual electrode pad 50 are used to form a single element denoted as "virtual electrodes."

Figure 7:
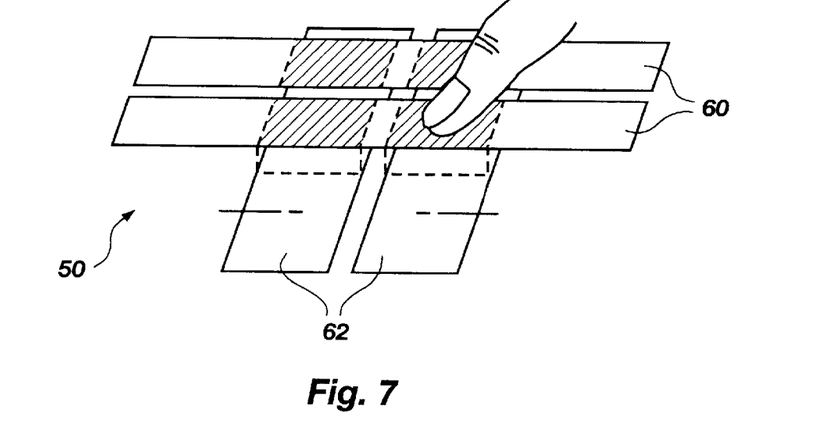
FIG. 7 is a perspective view of virtual dipole electrode constructed in accordance with the principles of the present invention.

FIG. 7 shows in a perspective view the prior art concept of an index-index electrode array on a small scale for illustration purposes only. The virtual electrode pad 50 has two row virtual electrodes 60 on the top side of the pad 50, and two column virtual electrodes 62 on the bottom side of the pad 50. The two row virtual electrodes 60 form a virtual dipole electrode. The components of the virtual electrode which form the virtual dipole electrode (VDE) are referred to as the positive (P) and the negative (N) halves of the VDE.

Figure 8:
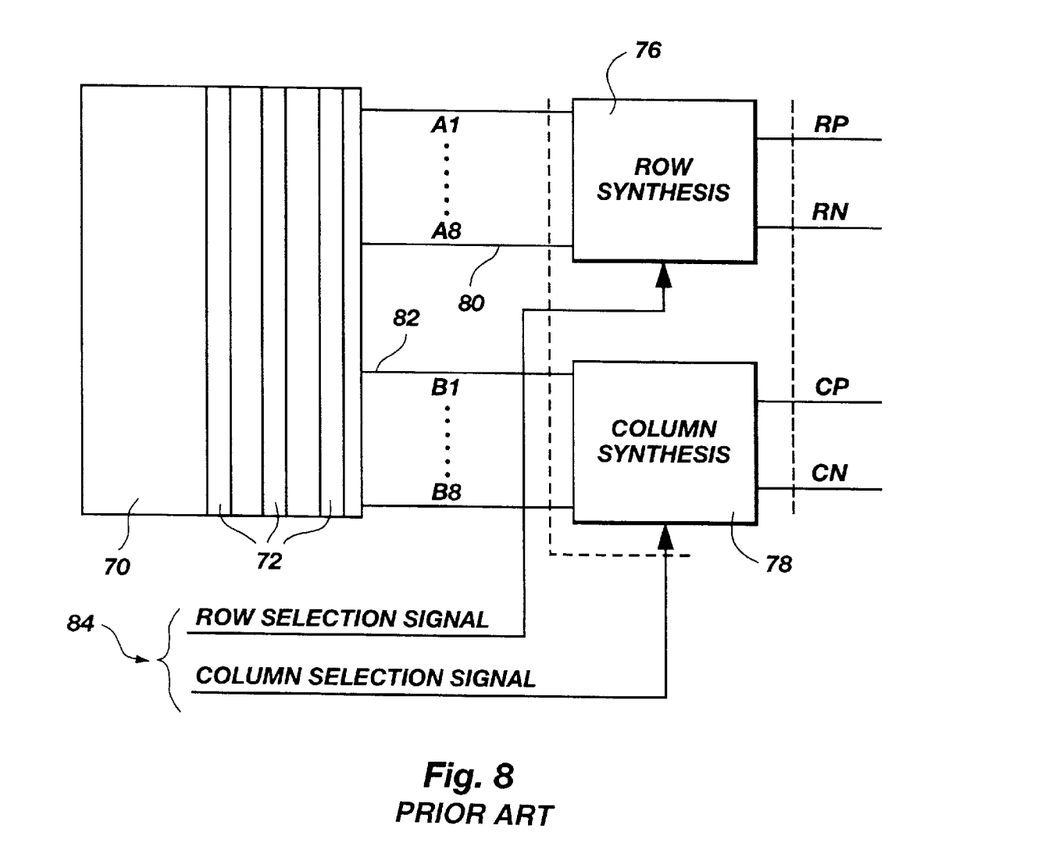
FIG. 8 is a block diagram of the prior art.

FIG. 8 is provided because the block diagram illustrates how the information measured from the index-index electrode array of the '017 patent is utilized to determine position of a probe with respect to the electrode arrays. First, virtual electrode pad 50 comprises a substrate 70 and a plurality of electrical strips 72 on both sides of the substrate 70. Electrode synthesis circuit comprises row synthesis circuit 76 and column synthesis circuit 78. For example, virtual electrode pad 50 is coupled to row synthesis circuit 76 via lines A1 through A8, shown generally at 80. Similarly, electrode pad 50 is coupled to column synthesis circuit 78 through lines B1 through B8, shown generally at 82. The '017 patent teaches driving signals on the RP, RN, CP and CN lines to determine probe position.

A signal 84 connects selected electrode strips to wires RP, RN, CP and CN to form one row and one column VDE. The location of the VDE is then varied according to the requirements of a control algorithm. Both halves of the VDE are coupled to the electrical balance measurement means 52 (FIG. 6). The electrical balance measurement is a measurement of mutual capacitance. In other words, the capacitance between the strips RP and RN, and between the strips CP and CN, is determined to find the lowest capacitance value, indicative of the electrodes 72 which are closest to the probe.

With this explanation of the VDE circuitry of the '017 patent, the improvements are shown as a result of a change in the physical structure of the index-index electrode array. Specifically, the structure of an index-index electrode array is modified in favor of independent index-sense electrode arrays.

Figure 9:
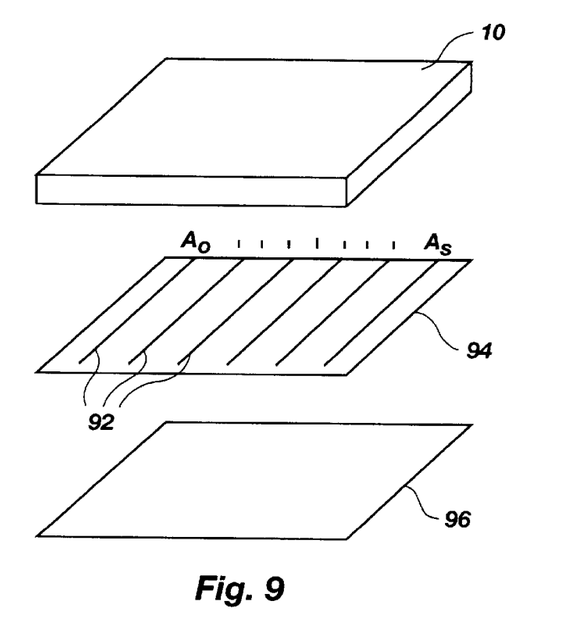
FIG. 9 is a preferred embodiment of an index-sense electrode array shown relative to a touchpad in accordance with the principles of the present invention.

FIG. 9 is a perspective illustration of a portion of the preferred embodiment of the present invention. Specifically, the index-index electrode array of the '017 patent is abandoned in favor of two independent index-sense electrode arrays. A single index-sense electrode array is shown to be comprised of a series of co-planar layers beginning with a touchpad surface 10 which is comprised of an insulating material. The insulating material enables mutual capacitances to be determined by preventing direct physical contact with the electrode arrays beneath.

The index-sense electrode array is comprised of a plurality of electrodes 92 forming a first electrode array 94, wherein the electrodes 92 are generally parallel to each other and are formed as a sheet in the plane of the touchpad surface 10. For illustration purposes only, the first electrode array 94 is shown with an exaggerated gap between itself and the touchpad surface 10 in order to illustrate the co-planar nature of the electrode array 94. The electrode array 94 forms rows or columns, depending upon orientation of the electrodes 92 with respect to an observer. However, the designation is merely arbitrary and is only important when the orientation of the electrode array 94 is viewed relative to another electrode array as will be shown.

Beneath the electrode array 94 and also shown with an exaggerated spacing is a sensing or sense electrode 96. When not formed on a same sheet as an electrode array, the sense electrode 96 is a sheet electrode comprised of a single electrical conductor instead of a plurality of electrodes. However, the sense electrode 96 can be perforated with holes or be formed from a plurality of electrodes forming an electrode array and still perform its function. What is important to remember is that the active sensing area is defined as the area where the electrode array 94 and the sense electrode 96 overlap. It should also be explicitly stated that the electrode array 94 and the sense electrode 96 are separated by an insulator.

Figure 10:
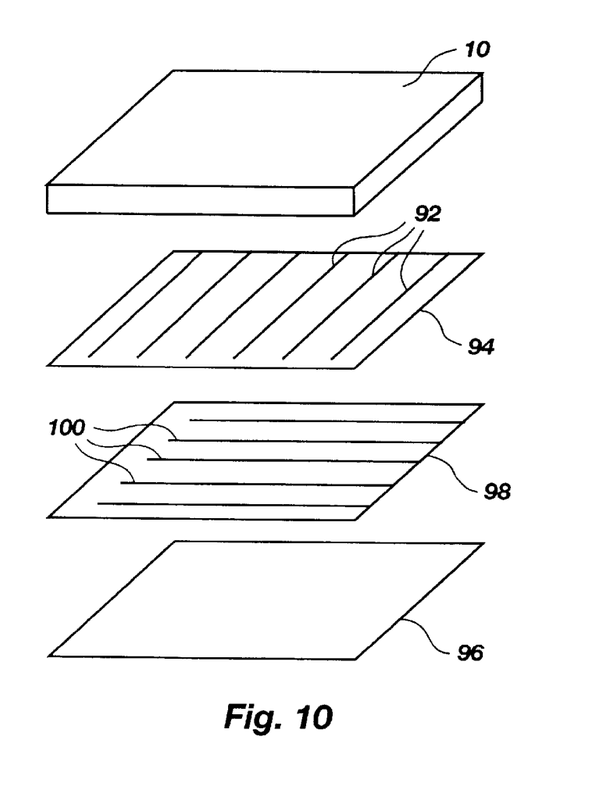
FIG. 10 is the preferred embodiment of the present invention utilizing two index-sense electrode arrays which share a common sense electrode.

FIG. 10 is an illustration of the preferred embodiment of the touchpad 10 of the present invention. Specifically, a second electrode array 98 has been inserted between the electrode array 94 and the sense electrode 96. The second electrode array 98 is comprised of electrodes 100 which are preferably oriented at a 90 degree angle with respect to the electrodes 92 of the first electrode array 94 as shown, and in the same plane as (co-planar with) the touchpad surface 10. By orienting the electrodes 100 at a generally 90 degree angle, sensing is then possible along two axes, arbitrarily assigned to be an x axis and a Y axis.

Referring back to FIG. 7, in the '017 patent, the two row virtual electrodes 60 would determine mutual capacitance relative to the two column virtual electrodes 62. However, in this preferred embodiment, mutual capacitance is always determined with respect to the sense electrode 96. Consequently, one of the advantages of the present invention is that a symmetry problem of the '017 patent is avoided, resulting in the present invention requiring only half the number of measurements.

In a preferred method of the present invention, at least one of the electrodes 92, 100 is selected as belonging to the P group, and at least one is selected as belonging to the N group. The mutual capacitances from each P electrode 92, 100 to the sense electrode 96 (S) are measured and the results are added together. Furthermore, the mutual capacitances from each N electrode 92, 100 to the sense electrode 96 are measured and the results are added together. Finally, the total mutual capacitance of the N to S are subtracted from the total of the P to S. The result is referred to as a VDE mutual capacitance measurement for the particular selected group of P and N electrodes 92, 100.

The two independent index-sense electrode arrays sharing a common sense electrode enable the present invention to independently determine X axis and Y axis position of the probe.

Another improvement over the '017 patent is related to an inherent drawback. Specifically, the nature of the apparatus resulted in a probe 16 potentially being located at two positions on the touchpad surface 10 which are diametrically opposite each other. As a result of this built-in symmetry problem, twice the number of measurements have to be taken in order to determine the actual position of the probe 16.

In contrast, the present invention is not subject to this symmetry problem because the index-sense electrode arrays are independent of each other. Accordingly, only half the number of measurements need to be made, resulting in a substantial decrease in the time required to determine the position of the probe 16. Experimental data shows that measurement cycle times (for one complete interpolated position measurement) decreased from about 3.84 milliseconds to about 1.92 milliseconds. In a related aspect, the overall bandwidth of the apparatus increased from about 80 samples per second to about 125 samples per second. Increased bandwidth is significant in that position information can be sent to the computer more rapidly. If the position information is being used for updating the position of the cursor on the computer display, the motion of the cursor is potentially smoother.

Another advantage of the present invention is related to a compensation memory matrix. The nature of the touchpad surface 10 is that it has contour irregularities or undulations. Although relatively minute, these irregularities can impact the performance of the apparatus. Method and apparatus have been developed for compensating for touchpad surface irregularities. One such method entails loading compensating values for surface irregularities into a compensation memory matrix at the locations where an X electrode crosses a Y electrode. Given that there are sixteen X electrodes and twelve Y electrodes in the preferred embodiment, this number of electrodes requires a compensation memory matrix of (16×12=192) 192 locations. For practical purposes, the compensation memory matrix was reduced to only 28 locations.

The present invention improves upon the concept of compensating for touchpad surface irregularities by building in tolerance. Compensation values are still determined at power-up, but the values which need to be stored in a compensation memory matrix correspond to one value for each X and Y electrode, not for each cross-over location or a subset of cross-over locations. Consequently in a 16 by 12 electrode matrix, the compensation memory matrix only needs to store information for (16+12=28) 28 locations.

The apparatus of the present invention also makes it possible to use standard PCB single core construction for the touchpad. Double core construction is required for the design of the '017 patent because compensation for surface irregularities is not built-in to the design. By moving to the single core construction, the cost of PCB for the touchpad construction is effectively reduced by half.

Before addressing another advantage, it is useful to remember that not only is the structure of the touchpad 10 improved by using an index-sense electrode array, but the position determination means 12 (FIG. 2) is also improved. Therefore, it is helpful to explode the view of the present invention as originally presented in FIG. 2. The touchpad is still shown generally at item 10, but the position determination means 12 is expanded to show more detail.

It should be mentioned that the function of the position determination means 12 is contained within a single integrated circuit. This integrated circuit is known as the 1997 version of the Pegasus chip which is available from the Cirque Corporation. However, it should be readily apparent that the functionality provided by the Pegasus chip 12 can be implemented by discrete circuits which are not integrated on a single substrate. What is crucial is that the functionality be duplicated.

Figure 12:
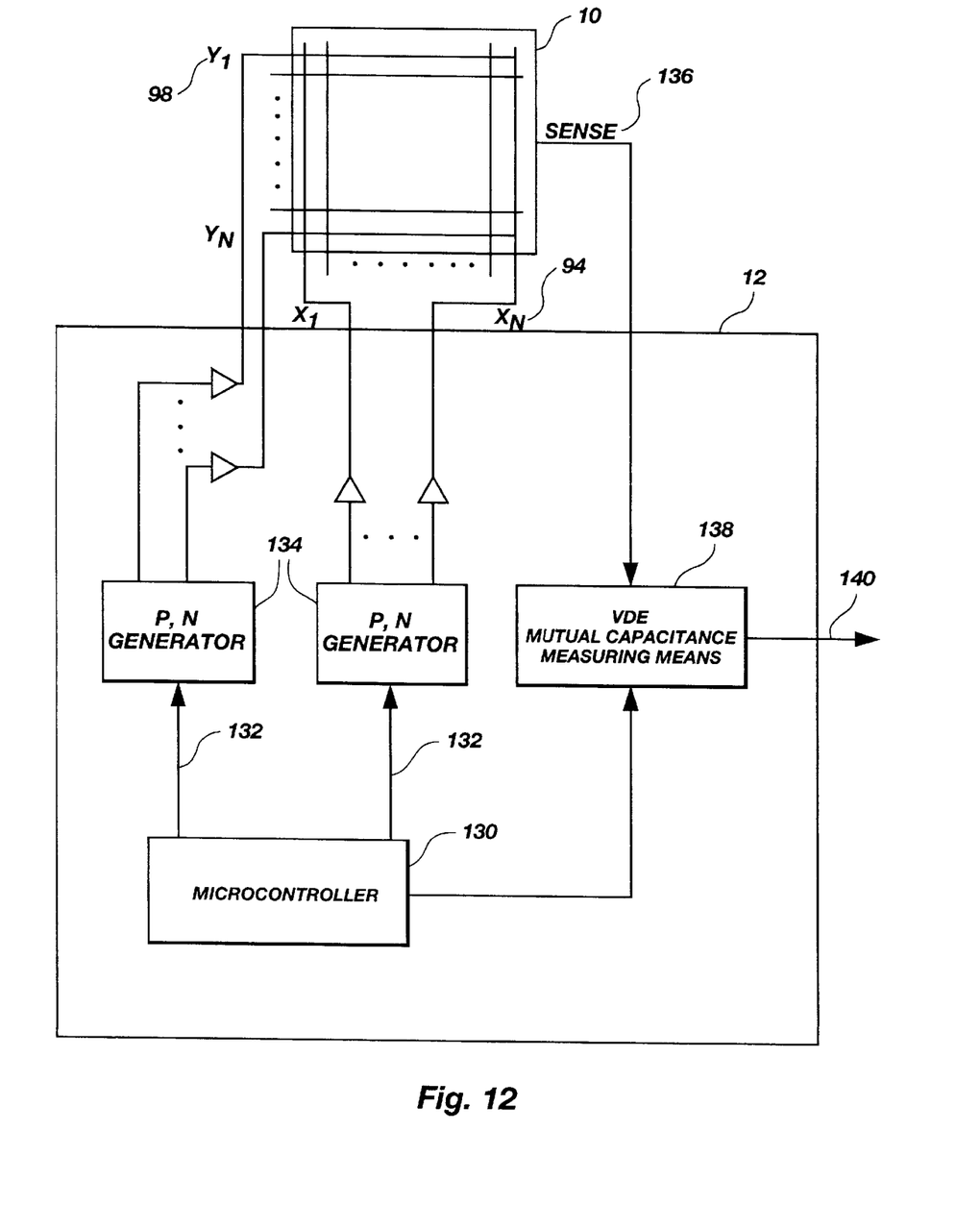
FIG. 12 is a functional block diagram which provides an exploded view of FIG. 2 showing functional detail of the apparatus of the preferred embodiment of the present invention.

Therefore, a more detailed examination of the position determination means 12 shows that there is a microcontroller 130 embedded therein for controlling all functions of the chip 12. The microcontroller 130 sends control signals to P and N generators 134. The P and N generators 134 are used to drive the index electrode arrays 94, 98 within the touchpad 10. A signal on the common sense electrode 136 is then measured by VDE mutual capacitance measuring means 138 to thereby provide position information 140 to, for example, the computer system which is displaying the cursor on the computer display.

The Pegasus chip 12 is constructed so that the VDE mutual capacitance measuring means 138 is able to measure mutual capacitance values from only one electrode array 94, 98 at a time. Nevertheless, the chip 12 is still able to provide position information 140 more rapidly than the apparatus of the '017 patent. It should be realized that any method for determining mutual capacitance as known to those skilled in the art can be utilized by the present invention. Any of these methods can be utilized by the present invention.

Figure 11:
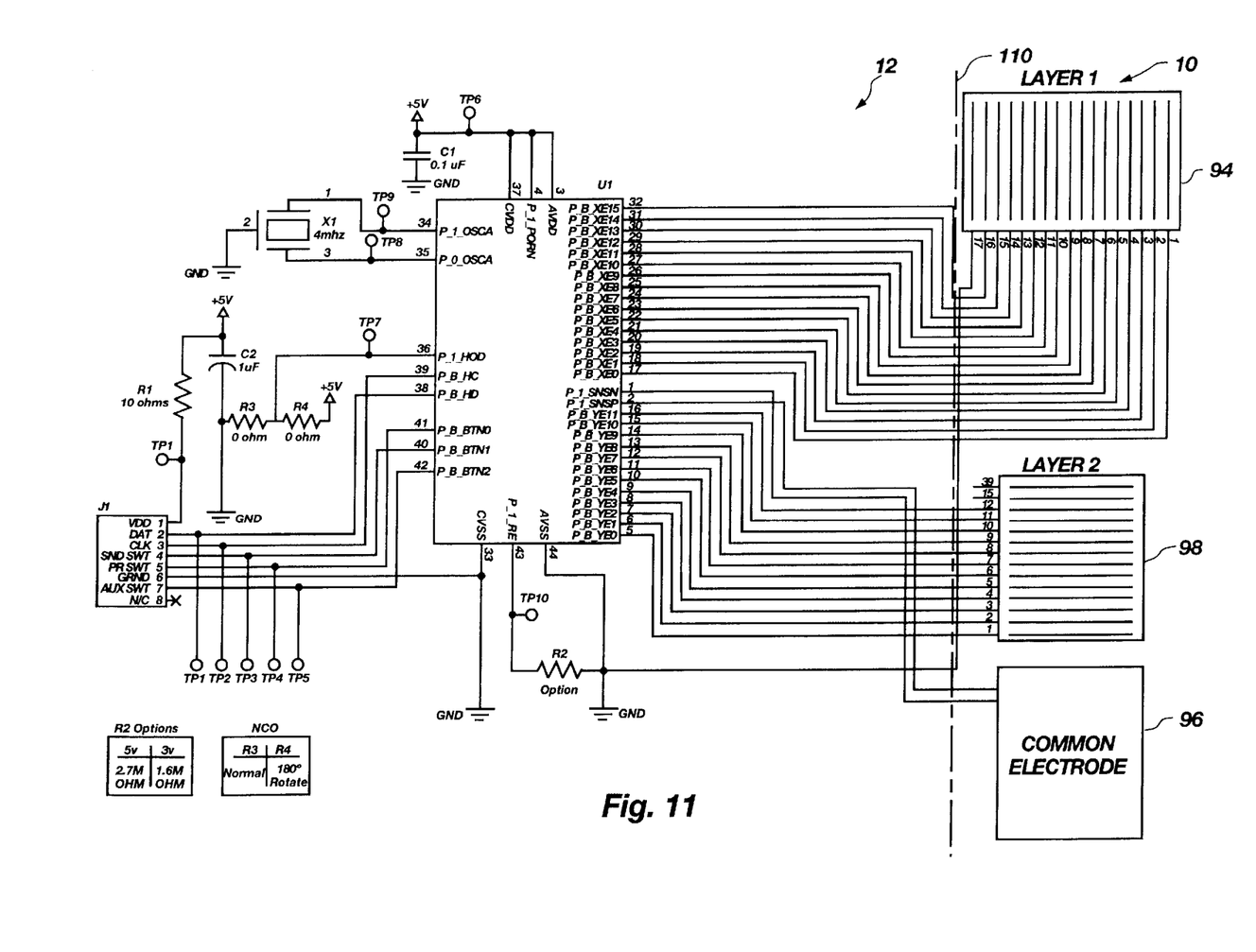
FIG. 11 is a schematic diagram of the preferred embodiment of the present invention utilizing two independent index-sense electrode arrays.

Another advantage of the present invention is the elimination of analog switches which were used in the '017 patent for selecting voltages to drive the index electrodes. To more easily illustrate these features, FIG. 11 provides a detailed schematic of the interconnections between the touchpad 10 and the Pegasus chip 12. As shown, no analog switches are required between the Pegasus chip 12 and the touchpad 10, resulting in faster operation of the apparatus, and overall lower power consumption. The touchpad 10 and the position determination means 12 are shown divided by the dotted line 110.

While the schematic of FIG. 11 enables someone skilled in the art to connect the Pegasus chip 12 to a touchpad as described in this and the '017 patent, a more functional diagram is provided in FIG. 12. FIG. 12 shows the functions being performed by the Pegasus chip 12. Specifically, the microcontroller 130 instructs the P and N generators 134 to drive the X and Y electrode arrays 94 and 98 with appropriate signals. Because there is only one sense electrode, the VDE mutual capacitance measuring means 138 (FIG. 12) must determine the position of the probe relative to the X and Y electrode arrays one at a time.

Figure 13:
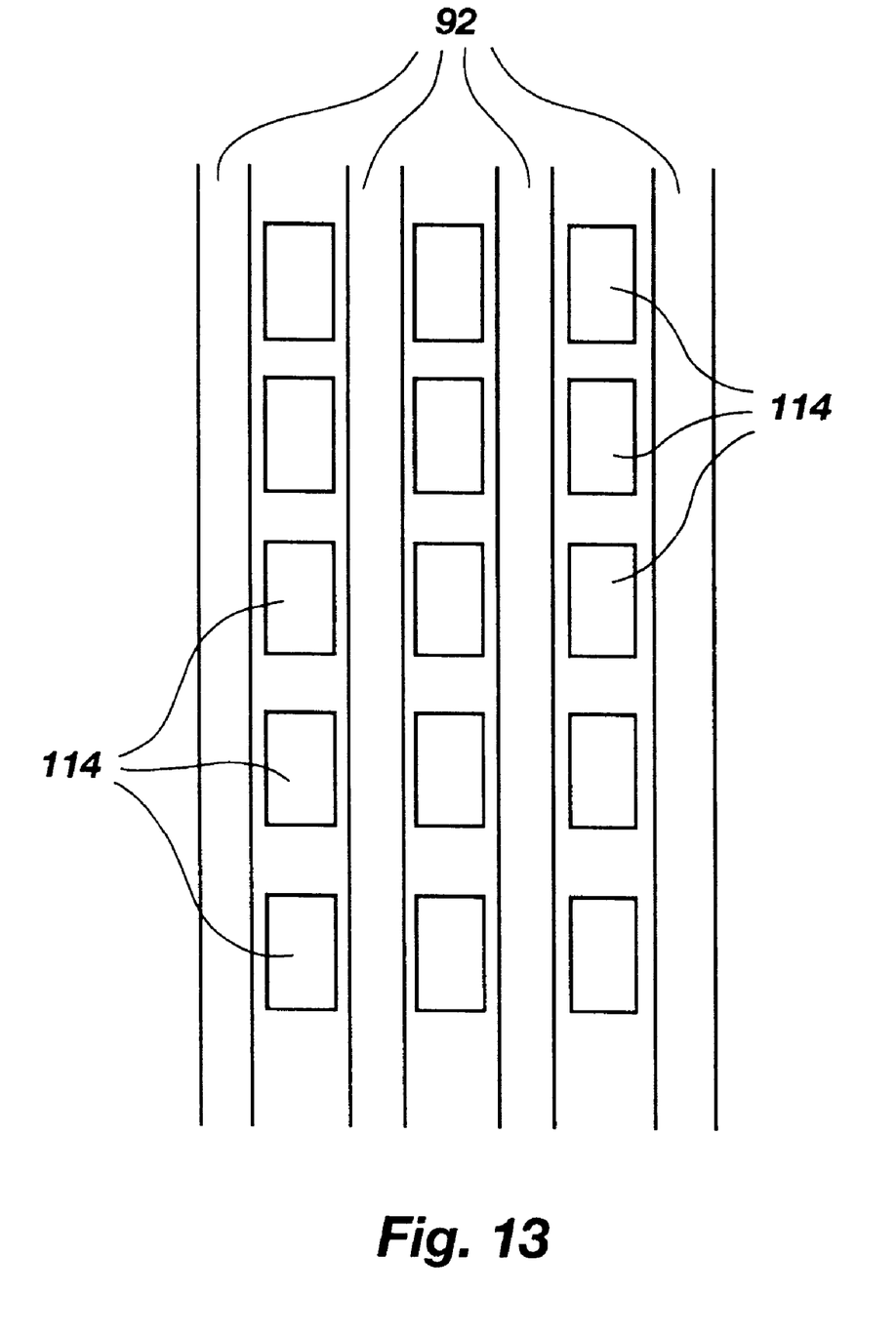
FIG. 13 is a top view of an alternative embodiment of the touchpad of the present invention which shows how the touchpad surface is supported by electrically isolated supports between the plurality of electrodes which form the electrode array closest to the touchpad surface.

FIG. 13 is provided as a close-up top view of an alternative embodiment of the touchpad of the present invention. In this embodiment, the touchpad surface 10 is supported by electrically isolated supports 114 between the plurality of electrodes 92 which form the electrode array 94 closest to the touchpad surface 10. The supports 114 prevent undesirable undulations on the touchpad surface 10 which decrease accuracy of the invention. Consequently, the supports 114 prevent the touchpad surface 10 from sagging between electrodes 92. However, a practical matter to consider is that although electrically isolated, these supports 114 do influence capacitance measurements when measured from the electrodes 92 to the common electrode 96 (not shown). Specifically, the supports 114 act to decrease sensitivity to capacitive imbalance between the electrode array 94 and the common electrode 96. Nevertheless there is still sufficient sensitivity to enable the present invention to use a decrease in mutual capacitance to detect the position of the probe.

The state of the art (including but not limited to the '017 patent) also teaches that the location of the probe relative to the X and Y axes are dependent quantities. The present invention teaches that they are in fact very independent quantities because of the common sense electrode 96. Therefore, while the sense electrode 96 is being shared, the VDE mutual capacitance of the first electrode array 94 with respect to the common sense electrode 96 can be determined independently of the VDE mutual capacitance of the second electrode array 98 with respect to the common sense electrode 96. Stated differently, by virtue of the use of a common sense electrode 96, the sensing of a position of a probe in the X axis is advantageously decoupled in time from the sensing of a position of the probe in the Y axis. Therefore, position determination can occur as rapidly as the mutual capacitances can be determined by the appropriate circuitry.

Figure 14:
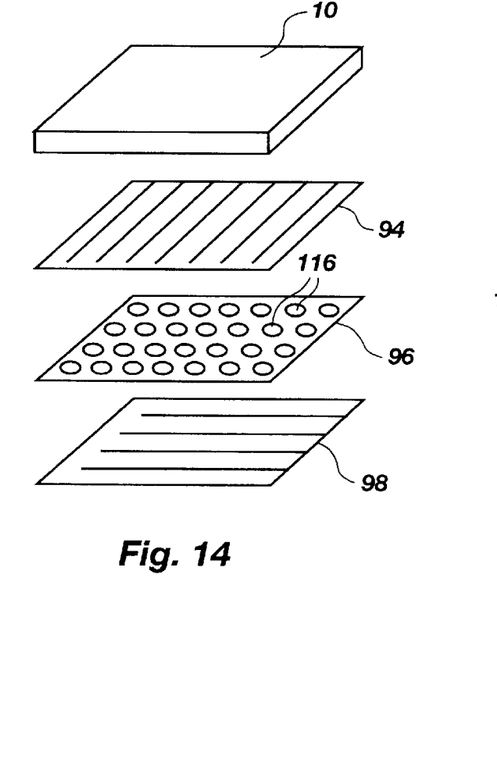
FIG. 14 is an alternative embodiment of FIG. 10 showing a different arrangement of the electrode arrays and the sense electrode relative to the touchpad surface.
Figure 15:
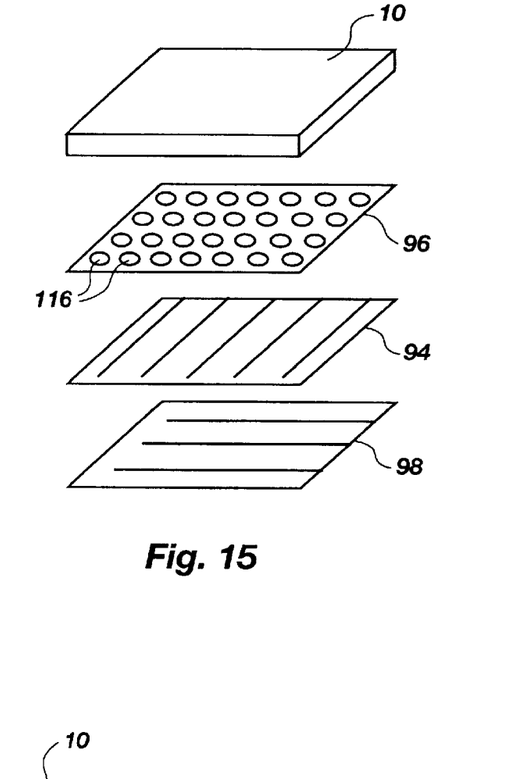
FIG. 15 is an alternative embodiment of FIG. 10 showing a different arrangement of the electrode arrays and the sense electrode relative to the touchpad surface.

While the preferred embodiment of the touchpad 10 is illustrated in FIG. 10, it is revealing to examine alternative embodiments. These alternative embodiments shown in FIGS. 14 and 15 reflect the fact that the preferred embodiment was selected for relatively arbitrary reasons. In other words, the placement of the first electrode array 94, the second electrode array 98 and the common sense electrode 96 in layers relative to the touchpad surface 10 does not affect the method of operation. Therefore, FIG. 14 shows that the common sense electrode 96 is now disposed between the first electrode 94 and the second electrode 98, and FIG. 15 shows that the common sense electrode 96 is now closest to the touchpad surface 10. Furthermore, not shown but now readily apparent is the observation that the first electrode 94 and the second electrode 98 can be interchanged without consequence.

As another practical matter, an important feature not readily shown in FIGS. 14 and 15 is that the common sense electrode 96 should be perforated, for example, with holes 116 whenever it is disposed in a layer between the touchpad surface 10 and one or both of the electrode arrays 94, 98. The perforations are necessary to enable flux lines to pass through the common sense electrode 96. Otherwise, the common sense electrode 96 would function as a barrier to flux lines.

Figure 16:
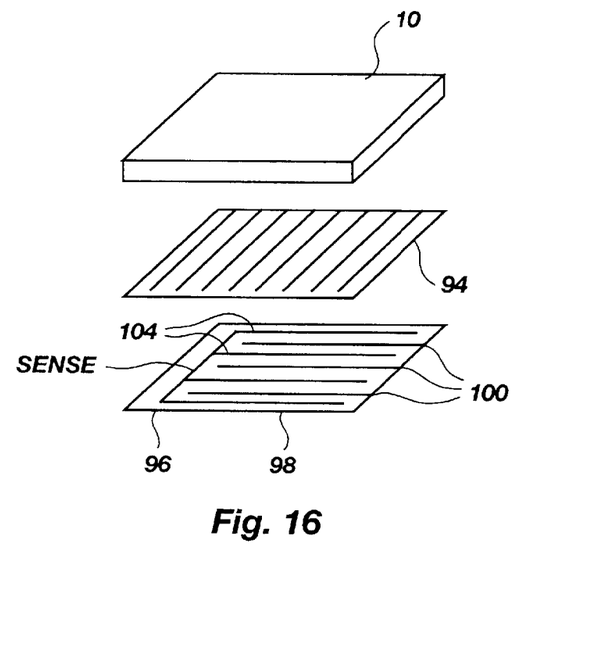
FIG. 16 is an alternative embodiment of FIG. 10 showing a different arrangement of the electrode arrays and the sense electrode relative to the touchpad surface, with the sense electrode combined with one of the electrode arrays.

An alternative embodiment which is perhaps less obvious than FIGS. 14 and 15 is shown in FIG. 16. Specifically, the first electrode array 94 is shown closest to the touchpad surface 10. However, the common sense electrode 96 and the second electrode array 98 have been combined into a single sheet. This combining of the second electrode array 98 and the common sense electrode 96 is possible by using an interdigitated arrangement of electrodes as shown. However, while each of the electrodes 100 of the second electrode array 98 is independently connected to VDE mutual capacitance measuring means 138 (FIG. 12), each of the electrodes 104 of the common sense electrode 96 are coupled together so as to share a common electrical charge.

After this explanation it should again be obvious that the first electrode array 94 and the second electrode array 98 can be interchanged without having any affect on the operation of the present invention. Furthermore, the common sense electrode 96 can also be disposed on the electrode array which is closest to the touchpad surface 10.

It should also be realized that the interpolation techniques applicable to the '017 patent are still applicable to the present invention. Specifically, the '017 patent taught linear interpolation. However, other interpolation techniques known to those skilled in the art can also be used. For example, the technique of centroid interpolation also makes it possible to determination probe position in a resolution which is smaller than the electrode pitch.

In summary, the present invention provides a method and apparatus for improved position determination of a probe disposed on or above a touch-sensitive surface. Specifically, a plurality of new configurations of driven and sense electrodes are provided in layers beneath the touchpad surface which advantageously decrease a total number of wires and measurements required to determine the position of the probe. Furthermore, the new configuration of electrodes enables simpler circuitry to control driving electrode arrays to create virtual dipole electrodes. A shared or common sense electrode is then measured to determine mutual capacitance values between electrodes. Finally, interpolation techniques enable the present invention to achieve position resolution of the probe which is much finer than the electrode pitch of the electrode arrays.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

We claim:

1. A data input device for sensing a position of a probe relative to a touchpad surface, wherein the data input device comprises:

a pad means for sensing the position of the probe, and wherein the pad means further comprises:

a plurality of first electrode strips disposed in a first parallel direction and spaced apart in at least a first electrode array, wherein at least a portion of the touchpad surface overlaps at least a portion of the first electrode array;

a sense electrode disposed co-planar with the first electrode array, and including fringe electric fields between the first electrode array and the sense electrode to thereby develop capacitive balances, wherein the probe disrupts the fringe electric fields when the probe comes in proximity to the pad means, thereby altering the capacitive balances, and wherein the at least a portion of the touchpad surface overlaps at least a portion of the common sense electrode;

measuring means electrically coupled to the pad means for measuring the capacitive balances in the pad means to thereby determine the position of the probe relative to the pad means; and interpolation means electrically coupled to the measuring means for determining probe position at a resolution which is less than a distance between individual electrodes of the at least a first electrode array.

2. The data input device as defined in claim 1 wherein the pad means further comprises:

a plurality of second electrode strips electrically insulated from but in a same plane as the first electrode strips, and spaced apart in a second electrode array which is disposed generally at a 90 degree angle relative to the first parallel direction, wherein at least a portion of the touchpad surface overlaps at least a portion of the second electrode array; and wherein the sense electrode is a common sense electrode disposed co-planar with the second electrode array, and including fringe electric fields between the second electrode array and the common sense electrode to thereby develop capacitive balances, wherein the probe disrupts the fringe electric fields when the probe comes in proximity to the pad means, thereby altering the capacitive balances.

3. The data input device as defined in claim 1 wherein the pad means further comprises means for selecting which electrode strips of the first electrode array and which electrode strips of the second electrode array are to have capacitive balances measured thereon.

4. The data input device as defined in claim 1 wherein the pad means further comprises means for causing development of electric fields between the first electrode array and the common sense electrode, and the second electrode array and the common sense electrode.

5. The data input device as defined in claim 3 wherein the pad means further comprises means for detecting changes in capacitive balances in the pad means, and the locations of said changes.

6. The data input device as defined in claim 1 wherein the pad means further comprises insulator means between the first electrode array, the second electrode array, the common sense electrode and the touchpad surface.

7. The data input device as defined in claim 1 wherein the common sense electrode is combined into a single sheet with the first electrode array or the second electrode array, but remains electrically isolated therefrom.

8. The data input device as defined in claim 7 wherein the common sense electrode is further comprised of a plurality of electrodes which are electrically coupled together and which are interdigitated with the plurality of electrode strips of the first electrode array or with the plurality of electrode strips of the second electrode array disposed in the single sheet.

9. The data input device as defined in claim 1 wherein the position of the probe is determinable only when the probe is disposed over an area of the touchpad surface which overlaps the first electrode array, the second electrode array and the common sense electrode.

10. The data input device as defined in claim 1 wherein the measurement means determines the capacitive balances in the pad means for the first electrode array independent of determining the capacitive balances in the pad means for the second electrode array.

11. The data input device as defined in claim 5 wherein the means for selecting which electrode strips are to have capacitive balances measured thereon further comprises means for supplying signals to selected pairs of electrode strips in the first electrode array to thereby form selected virtual dipole electrodes, and for supplying signals to selected pairs of electrode strips in the second electrode array to thereby form selected virtual dipole electrodes, each virtual dipole electrode having a positive half electrode strip and a negative half electrode strip such that electric fields are established between selected halves of one polarity in the first electrode array, and selected halves of the opposite polarity in the second electrode array.

12. The data input device as defined in claim 11 wherein the means for detecting further comprises:

means for successively calculating capacitive balances between selected halves of virtual dipole electrodes in the first electrode array and halves of virtual dipole electrodes in the second electrode array;

means for calculating capacitive balance ratios for selected pairs of calculated capacitive balances; and means for calculating the position of the probe relative to the pad means from the calculated capacitance balance ratios and the locations of the virtual dipole electrodes producing the calculated capacitive balances.

13. The data input device as defined in claim 12 wherein the data input device is mounted to a keyboard input device of a computer.

14. The data input device as defined in claim 13 wherein the data input device is electrically passive.

15. The data input device as defined in claim 1 wherein the common sense electrode is disposed nearest the touchpad surface.

16. The data input device as defined in claim 1 wherein the common sense electrode is disposed between the first electrode array and the second electrode array.

17. The data input device as defined in claim 1 wherein the common sense electrode is disposed furthest from the touchpad surface relative to the first and the second electrode array.

18. The data input device as defined in claim 1 wherein the interpolation means is further comprised of a linear interpolation means.

19. The data input device as defined in claim 1 wherein the interpolation means is further comprised of a centroid interpolation means.

20. A data input device for sensing a position of a probe relative to a touchpad surface, wherein the data input device comprises:

a pad means for sensing the position of the probe, and wherein the pad means further comprises:

a first electrode array;

a second electrode array disposed beneath the first electrode array in a co-planar arrangement;

a common sense electrode disposed beneath the second electrode array in a co-planar arrangement, and including fringe electric fields between the first electrode array and the common sense electrode and the between the second electrode array and the common sense electrode to thereby develop capacitive balances, wherein the probe disrupts the fringe electric fields when the probe comes in proximity to the pad means, thereby altering the capacitive balances;

measurement means electrically coupled to the pad means for measuring the capacitive balances in the pad means to thereby determine the position of the probe relative to the pad means; and interpolation means electrically coupled to the measurement means for determining probe position at a resolution which is less than a distance between individual electrodes of the first or the second electrode array.

21. A method for measuring a probe's position relative to a touch-sensitive surface, wherein the touch-sensitive surface functions by measuring the probe's position utilizing detection of a decrease in mutual capacitance in electrode arrays of the touchpad, said method comprising the steps of:

(1) providing a first electrode array disposed beneath and co-planar with the touch-sensitive surface, wherein the first electrode array measures a decrease in mutual capacitance to detect the probe's position;

(2) providing a second electrode array disposed beneath and co-planar with the touch-sensitive surface, wherein the second electrode array measures a decrease in mutual capacitance to detect the probe's position;

(3) providing a shared sense electrode disposed beneath and co-planar with the touch-sensitive surface; and (4) determining the position of the probe utilizing an interpolation algorithm.

22. The method for measuring a probe's position as defined in claim 21 wherein the method further comprises the step of disposing the shared sense electrode nearest to the touch-sensitive surface.

23. The method for measuring a probe's position as defined in claim 21 wherein the method further comprises the step of disposing the shared sense electrode between the first electrode array and the second electrode array.

24. The method for measuring a probe's position as defined in claim 21 wherein the method further comprises the step of disposing the shared sense electrode furthest from the touch-sensitive surface relative to the first electrode array and the second electrode array.

25. The method for measuring a probe's position as defined in claim 23 wherein the method further comprises the steps of:

(1) determining a coarse position of the probe independent of the interpolation algorithm; and (2) determining a fine position of the probe utilizing the interpolation algorithm.

26. The method for measuring a probe's position as defined in claim 25 wherein the method further comprises the step of interpolating using linear interpolation.

27. The method for measuring a probe's position as defined in claim 25 wherein the method further comprises the step of interpolating using centroid interpolation.

28. A method of measuring a probe's position relative to a touch-sensitive surface, said method comprising the steps of:

(1) providing an electrically sensitive touchpad comprising:
   insulator means for providing an insulating substrate;
   first electrode means for establishing an electrical field;
   second electrode means for establishing an electrical field; and
   a common sense electrode means for establishing the electrical fields relative to the first electrode means and the second electrode means;

(2) measuring electrical balances between the first and the common sense electrode means;

(3) measuring electrical balances between the second and the common sense electrode means; and (4) calculating the probe's position based on the measured balances between the first electrode means, the second electrode means and the common sense electrode means utilizing an interpolation algorithm.

* * * * *